S. SHAPIRO.
PASTEURIZING APPARATUS.
APPLICATION FILED MAY 22, 1909.
933,927.
Patented Sept. 14, 1909.
2 SHEETS—SHEET 1.
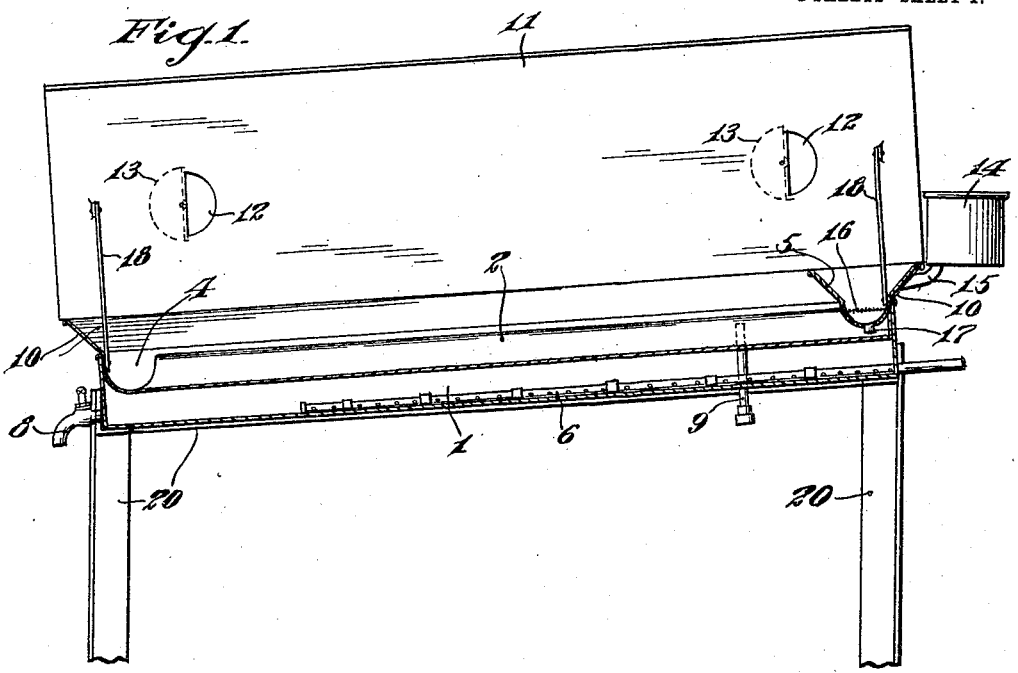
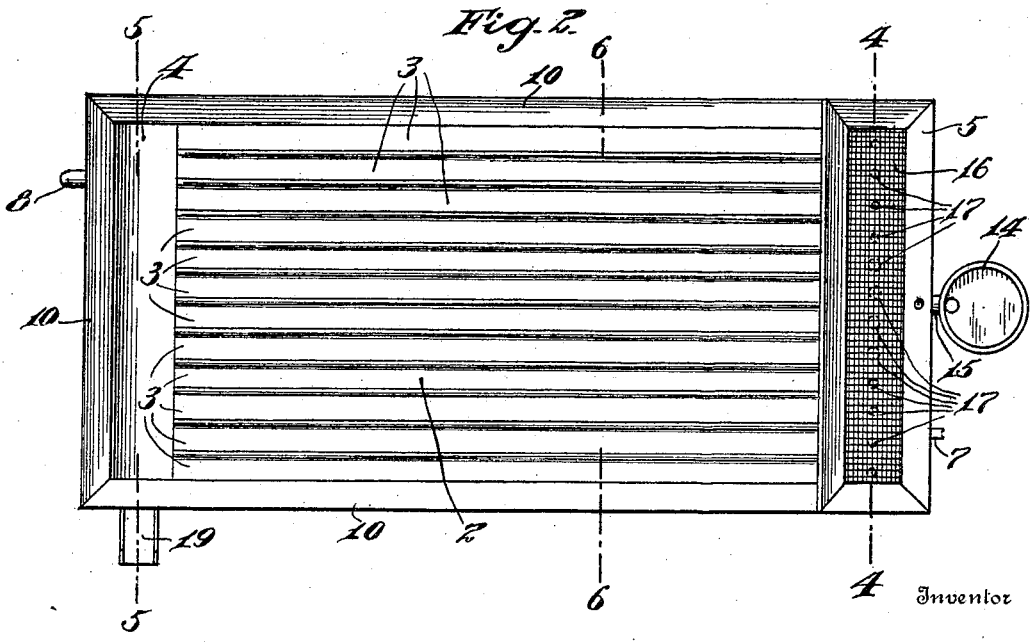
Witnesses
Inventor
Samuel Shapiro,
By Joshua R. H. Potts
Attorney S. SHAPIRO.
PASTEURIZING APPARATUS.
APPLICATION FILED MAY 22, 1909.
933,927.
Patented Sept. 14, 1909.
2 SHEETS—SHEET 2.
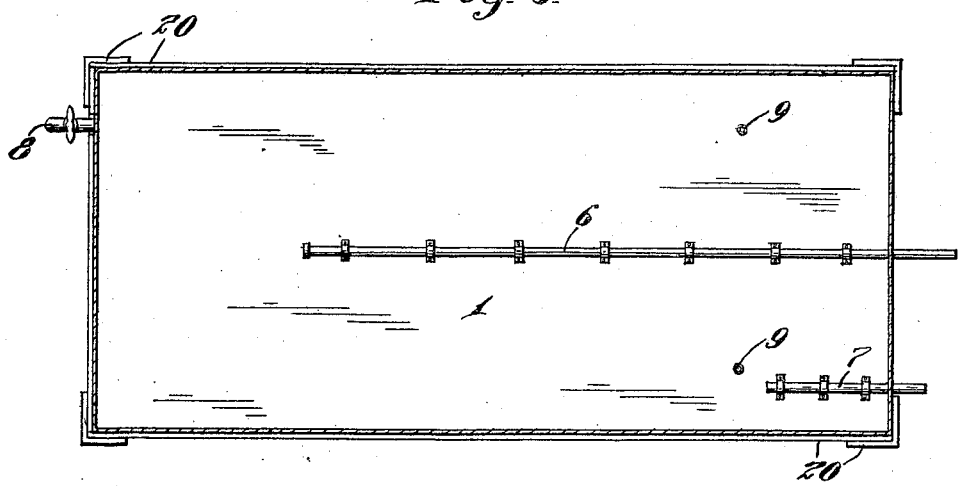
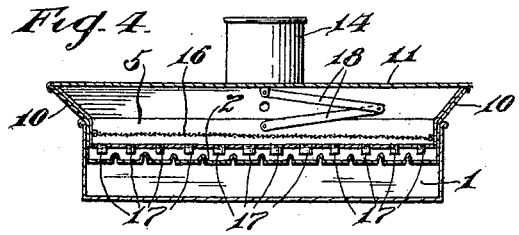
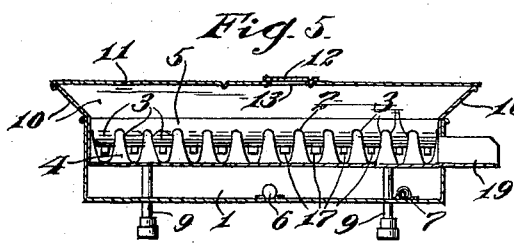
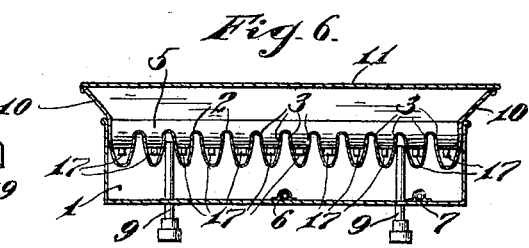
Witnesses
Theo. Rosenauud.
J. A. L. Mulhall.
Inventor
Samuel Shapiro,
By Joshua R. H. Potts.
Attorney

UNITED STATES PATENT OFFICE.

SAMUEL SHAPIRO, OF PHILADELPHIA, PENNSYLVANIA.

PASTEURIZING APPARATUS.

933,927.  Specification of Letters Patent.  Patented Sept. 14, 1909.

Application filed May 22, 1909. Serial No. 497,571.

*To all whom it may concern:*

Be it known that I, SAMUEL SHAPIRO, a citizen of the United States, residing at Philadelphia, in the county of Philadelphia and State of Pennsylvania, have invented certain new and useful Improvements in Pasteurizing Apparatus, of which the following is a specification.

My invention relates to an improved pasteurizing apparatus, the object of the invention being to provide improvements of this character, which will most effectually and uniformly pasteurize milk, while the latter moves in a continuous stream throughout paths provided for the purpose, and provide improved means whereby the milk will be compelled to travel in large quantities over the hotter portion of the apparatus, and in smaller quantities over the cooler portion of the apparatus, so as to equalize the heat transmission to the milk, and thereby insure a uniform pasteurization.

With these and other objects in view, the invention consists in certain novel features of construction, and combinations and arrangements of parts as will be more fully hereinafter described and pointed out in the claims.

In the accompanying drawings, Figure 1, is a view in longitudinal section illustrating my improvements. Fig. 2, is a top plan view with the cover removed. Fig. 3, is a view in longitudinal horizontal section. Fig. 4, is a view in cross section on the line 4—4 of Fig. 2. Fig. 5, is a view in section on the line 5—5 of Fig. 2. Fig. 6, is a view in cross section on the line 6—6 of Fig. 2.

1 represents a heating tank, and 2 a cover on the tank, composed of corrugated metal comprising a series of longitudinal troughs 3, all of which are adapted to empty into a lateral trough 4, and are supplied from a distributing trough 5 at the other end of the apparatus. The tank 1 is adapted to contain water heated by steam from a pipe 6, and 7 is a water inlet, and 8 a water outlet to supply and drain the tank.

9 represents pipes, which project up into the tank, so as to permit an overflow when the water reaches the desired height. A wall 10 is provided around the apparatus, and a cover 11 is hinged to this wall, and provided with openings 12, through which the milk can be viewed, and these openings are normally closed by pivoted covers 13.

The distributing trough 5 extends transversely across the apparatus at its higher end, and receives milk from a funnel 14 and spout 15, the latter directing the milk into the trough 5 about its center. A screen 16 is provided in the bottom of this trough to catch foreign matter, and short tubes 17 communicate with openings in the bottom of the trough to discharge milk into the several longitudinal troughs 3. It will be noted that the four central openings and tubes 17, are of appreciably greater diameter than are the openings and tubes 17 adjacent the ends of the trough, this is to allow for the difference in the temperature of the central portion of the apparatus, and the sides or ends. In other words, the central portion of the apparatus is necessarily the hottest, and it is desirable to have the greatest quantity of milk to pass through the central troughs to prevent scorching, and while I have illustrated four of these holes and tubes 17 larger than the others, it is obvious that the sizes may be regulated to suit conditions. The cover 11 is connected by pivoted links 18 with the wall 10, which links form a toggle joint to hold the cover in raised position.

The operation is as follows: Milk supplied to funnel 14 enters the distributing trough 5, and is thoroughly screened by the screen 16, and then passes into the several tubes 17, the greater quantity entering the larger tubes at the center, and passing throughout the hotter longitudinal troughs 3, and the lesser quantities entering the side tubes 17 and passing throughout the longitudinal troughs 3 nearest the sides, where the device is coolest. The milk from all the troughs 3 enters the transverse troughs 4, and is directed by a spout 19 into cans or other receptacles provided for the purpose.

The apparatus may be supported at a slight incline by means of a frame-work 20, but I of course do not limit myself to any particular supporting means.

Various slight changes might be made in the general form and arrangement of parts described without departing from my invention, and hence I do not restrict myself to the precise details set forth, but consider myself at liberty to make such changes and alterations as fairly fall within the spirit and scope of the claims.

Having thus described my invention what I claim as new and desire to secure by Letters Patent is:

1. In a pasteurizing apparatus, the combination with a series of longitudinal troughs, a water chamber below said troughs, and a longitudinal steam pipe located centrally in said chamber, and having perforations through which steam is discharged into the water chamber, of a transverse trough communicating with all of said longitudinal troughs at one end, and a transverse distributing trough at the other end of said longitudinal troughs, having an opening above each longitudinal trough, said openings largest at the central portion of said distributing trough, and smaller at the ends thereof.

2. In a pasteurizing apparatus, the combination with a series of longitudinal troughs, a water chamber below said troughs, and a longitudinal steam pipe located centrally in said chamber, and having perforations through which steam is discharged into the water chamber, of a transverse trough communicating with all of said longitudinal troughs at one end, and a transverse distributing trough at the other end of said longitudinal troughs, having an opening above each longitudinal trough, said openings largest at the central portion of said distributing trough, and smaller at the ends thereof, a hinged cover adapted to close all of said troughs, and outlet pipes projecting up into the water chamber, substantially as and for the purpose set forth.

3. In a pasteurizing apparatus, the combination with a series of longitudinal troughs, a water chamber below said troughs, and a longitudinal steam pipe located centrally in said chamber, and having perforations through which steam is discharged into the water chamber, of a transverse trough communicating with all of said longitudinal troughs at one end, and a transverse distributing trough at the other end of said longitudinal troughs, having an opening above each longitudinal trough, said openings largest at the central portion of said distributing trough, and smaller at the ends thereof, a screen in said distributing chamber above the openings, and tubes depending from the distributing chamber, and communicating with said openings, whereby the milk from said distributing chamber is discharged close to the bottom of the longitudinal troughs.

In testimony whereof I have signed my name to this specification in the presence of two subscribing witnesses.

SAMUEL SHAPIRO.

Witnesses:
R. H. KRENKEL,
J. A. L. MULHALL.